United States Patent [19]
Wilson, III

[11] Patent Number: 5,355,075
[45] Date of Patent: Oct. 11, 1994

[54] ROTATING TELECOMMUNICATIONS POWER SUPPLY

[75] Inventor: Grover C. Wilson, III, Eaton, Ohio

[73] Assignee: Hobart Brothers Company, Troy, Ohio

[21] Appl. No.: 9,768

[22] Filed: Jan. 27, 1993

[51] Int. Cl.⁵ .............................................. H02J 7/14
[52] U.S. Cl. ...................................................... 322/25
[58] Field of Search .................. 322/21, 24, 25, 27, 322/58; 320/61, 62, 64

[56] References Cited

U.S. PATENT DOCUMENTS

| | | | |
|---|---|---|---|
| 4,598,373 | 7/1986 | Morishita et al. | 322/25 X |
| 4,839,576 | 6/1989 | Kaneyuki et al. | 322/25 |
| 5,055,765 | 10/1991 | Rozman et al. | 322/25 X |
| 5,182,510 | 1/1993 | Nakamura | 322/21 |

OTHER PUBLICATIONS

Hobart Brothers Company-Model No. ACL 48T200 dated May 14, 1986.
Hobart Brothers Company-Battery Charger Manual dated Mar. 19, 1990.
Hobart Brothers Company-Operation & Maintenance Manual dtd Sep. 1, 1990.
Hobart Brothers Company-MEGA-ARC 4030 G Manual Rev. Oct. 15, 1992.
Hobart Brothers Company-Model Champion 18 Air Cooled Gas Drive Welder Manual-Rev. Dec. 1, 1992.

*Primary Examiner*—Kristine L. Peckman
*Attorney, Agent, or Firm*—Biebel & French

[57] ABSTRACT

A low noise, essentially ripple free power supply for supplying power to a telecommunications system includes a gasoline, propane, natural gas or diesel fueled engine driving a rotating field power generator to produce an alternating current output which is then rectified and applied to a special filter circuit to provide an output current having less than 100 mVolts ripple and less than 22 dBrnc noise, which is acceptable to the telecommunications industry. A current sensor connected to the output of said filter circuit monitors the output current to the telecommunications system, and a regulator circuit responds to the voltage and current output of the power supply to control current to the rotating field coils to provide a regulated, substantially constant, output voltage level up to a predetermined maximum current output. A high voltage shutdown circuit shuts down the engine and opens a circuit breaker whenever the voltage output to the telecommunications system exceeds a predetermined level.

9 Claims, 7 Drawing Sheets

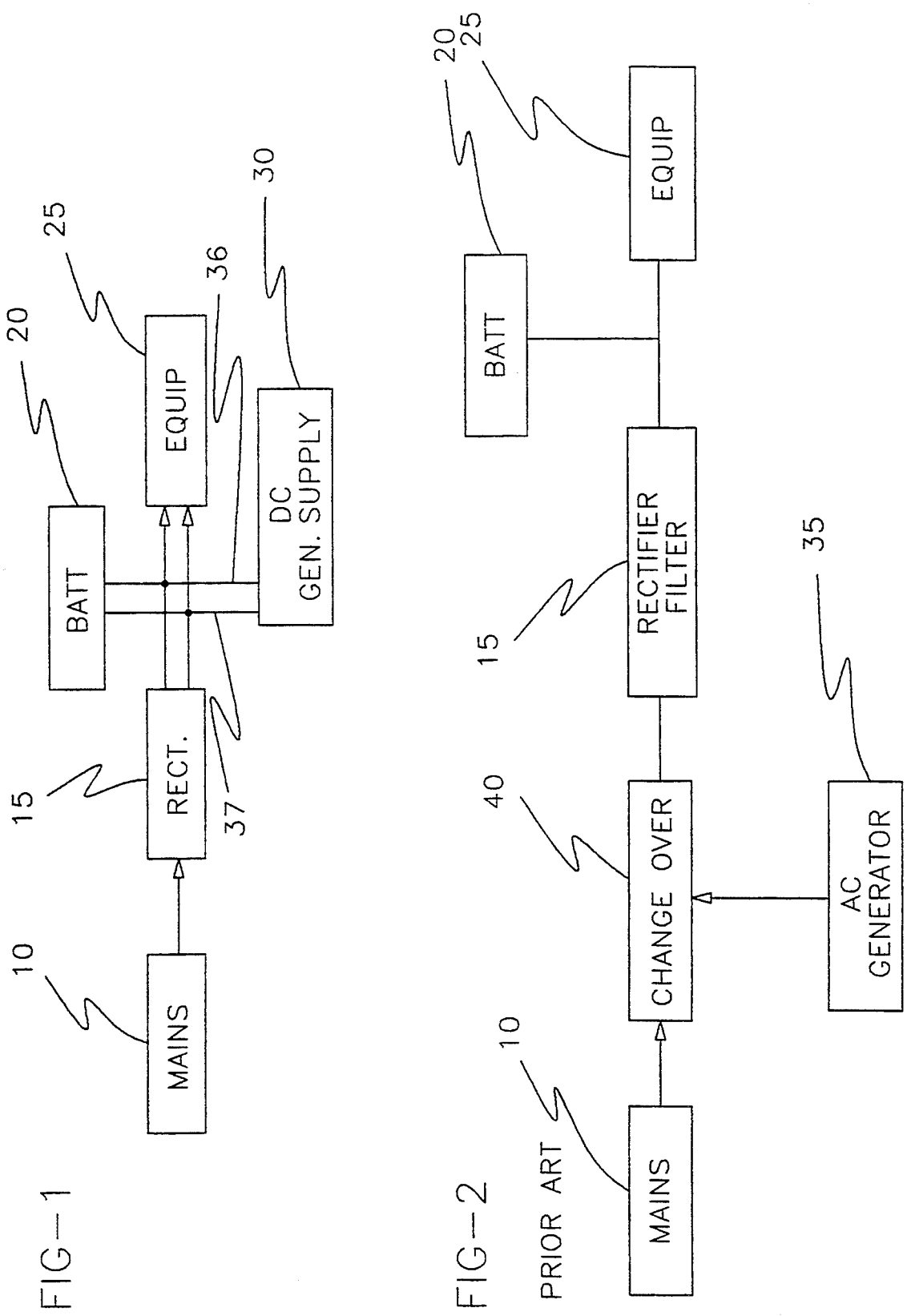

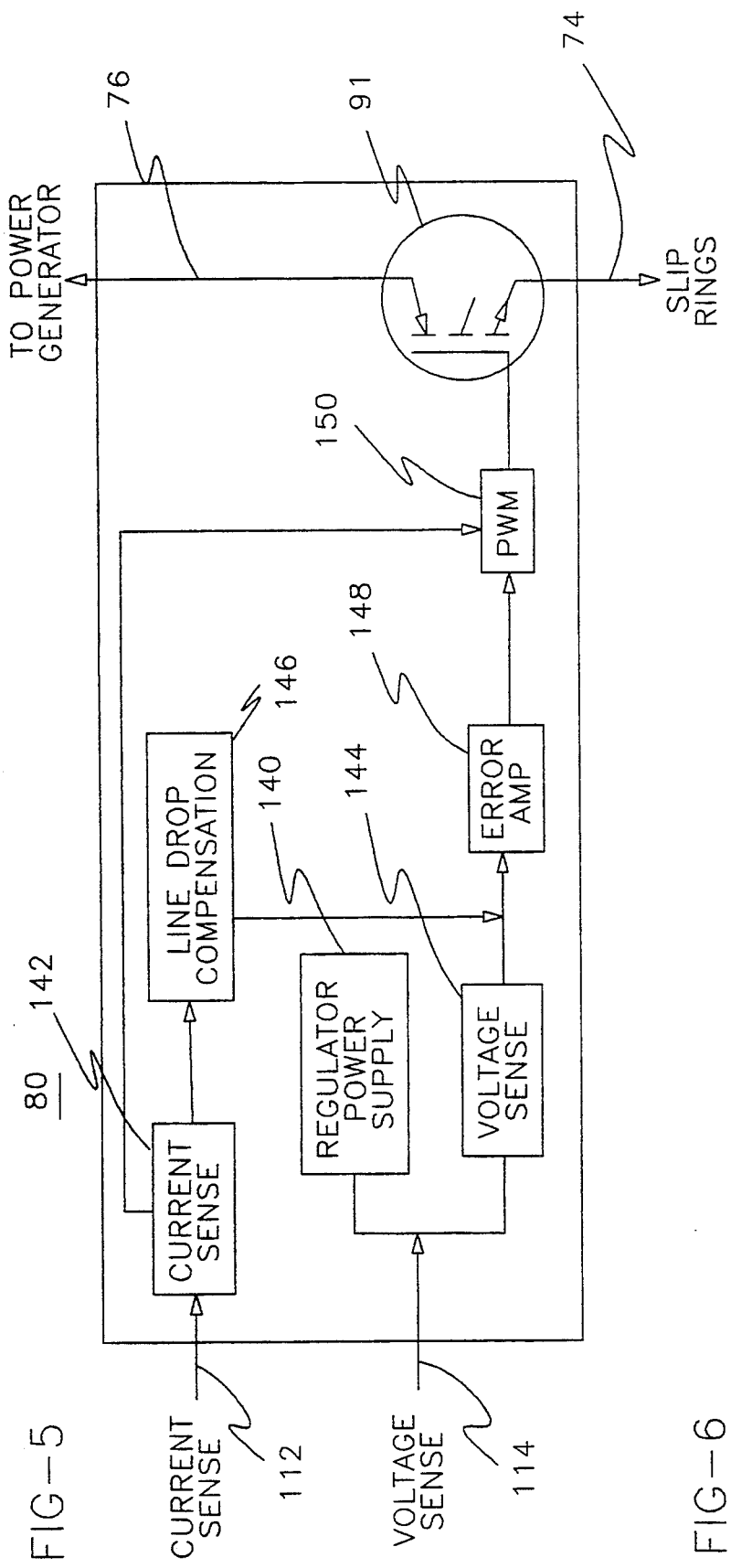

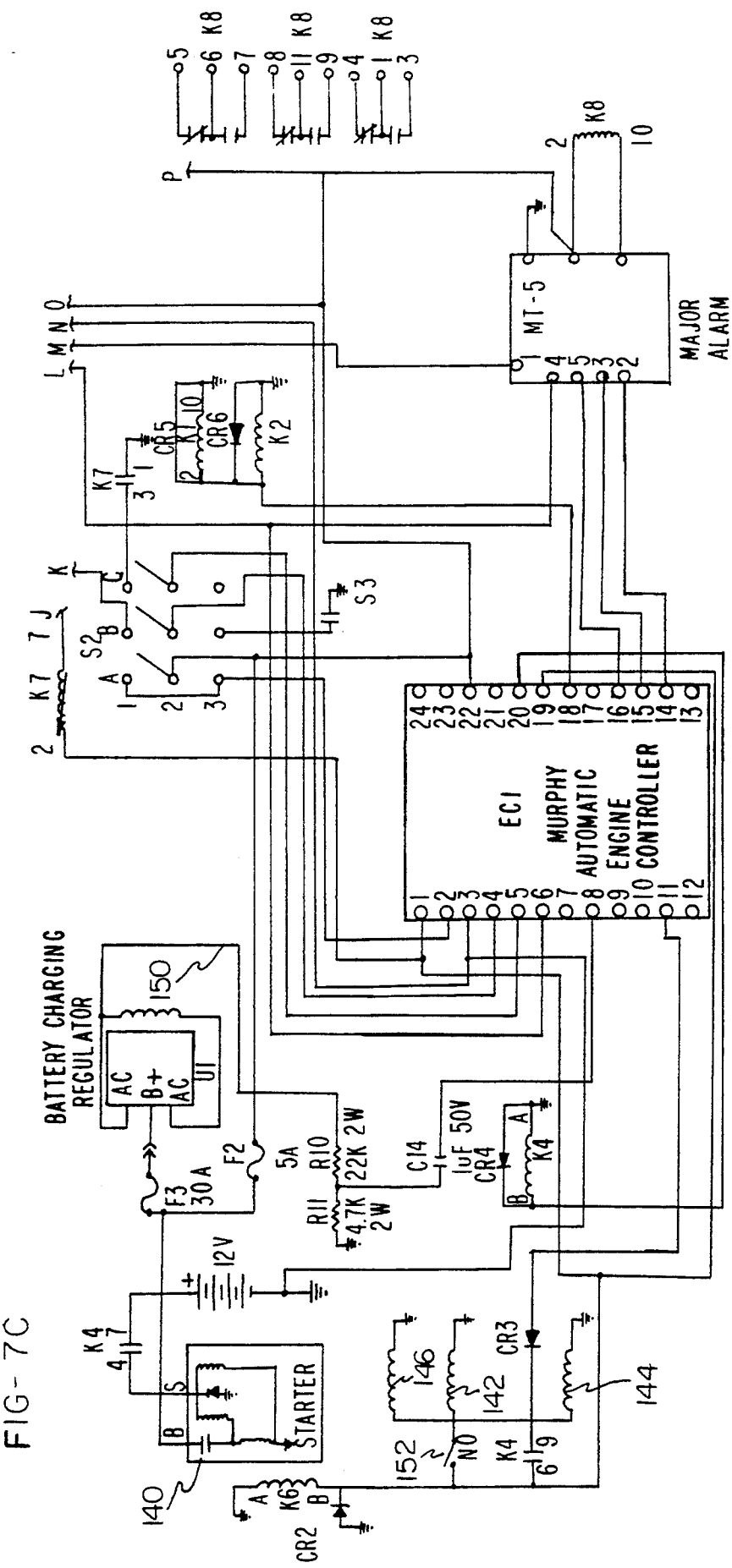

ROTATING TELECOMMUNICATIONS POWER SUPPLY

BACKGROUND OF THE INVENTION

Telecommunications systems, including telephone exchanges and cellular phone sites, are normally provided with a set of back-up batteries to supply power to the system in the event there is a loss of commercial AC power at that location. The back-up batteries, usually large lead-acid batteries, can provide sufficient power to run the system for several hours.

Lead-acid batteries, which occupy a large amount of space in the telecommunications system, must be maintained at full charge at all times, and therefore they are connected to a charging system that also runs off the commercial AC power lines. Should there be a loss of commercial AC power, the batteries will supply the necessary operating voltage to the system, and when commercial power returns, the charging system will not only provide power to the system, but also replenish the energy taken from the batteries. Since the battery charging system is at all times connected to the batteries, its output current waveform must be essentially ripple free and have extremely low output noise voltage (conducted) as defined in NEMA Standard Nov. 16, 1978, publication No. PV 7, Part 4, PV 7-4.03.

Most major telephone exchanges include an engine powered generator to provide alternating current to operate the battery charging system so that the exchange can operate indefinitely, limited only by the available fuel supply. The generator is connected to the exchange by means of a change over switch which may be either manually operated or automatically operated whenever there is a loss of commercial power. The change over switch is necessary to prevent power from the generator from reentering the commercial power grid.

Many smaller telephone exchanges and cellular telephone sites, however, are not equipped with such engine powered generators. Accordingly, such systems are limited in the amount of time they can operate before the energy stored in the back-up batteries is consumed.

It would be desirable to provide an engine driven charging system connected directly to the batteries, thus eliminating the need for a change over switch, but previously existing direct current power sources were not properly regulated nor did they have output power characteristics of such purity that they could be used in telecommunications systems.

SUMMARY OF THE INVENTION

The present invention relates to a unique direct current power supply for charging or replacing backup batteries in a telecommunications system, such as a telephone exchange or cellular telephone site.

The present invention is a merger of several different technologies and includes an engine driven, alternating current generator, a regulator circuit, and a filter. The generator may either be of the type used to provide welding current or it may be a ground power unit for supplying power to aircraft at a terminal. The regulator adjusts the current to rotating field coils in the generator to maintain a controlled, usually constant, voltage output up to a maximum current level, and then to maintain a constant current output. The filter is especially designed for use in the telecommunications industry in that it provides an essentially ripple free output waveform with low output noise voltage (conducted).

Further, the present invention compensates for the voltage drop due to length of cable between the power supply and the batteries, thus eliminating the need for remote voltage sensing lines. In addition, the present invention includes an over voltage protection circuit and alarm circuits.

By using the engine driven power supply of the present invention, the size of the back-up lead-acid batteries can be substantially reduced, thus freeing valuable space for telecommunications equipment, since this invention, which is relatively inexpensive compared to prior art generators, can be installed permanently across the batteries without the need for a change over switch, and designed to start whenever the voltage on the batteries falls below a predetermined level.

Accordingly, it is an object of this invention to provide an improved low noise, ripple free power supply for supplying power to a telecommunications system, the power supply including a power generator, a regulator circuit for controlling the voltage and current output of the power generator, a rectifier circuit for converting the power generator output to direct current, a filter circuit connected to the output of the rectifier circuit for providing an output current of 100 mVolts ripple or less and 32 dBrnc noise or less, as defined in NEMA Standard Nov. 16, 1978, publication number PV 7, Part 1, PV 7-1.04, and a current sensor for monitoring the output current to the telecommunications system, wherein the regulator circuit is responsive to the output from the current sensor and the output voltage for providing a regulated output voltage level up to a predetermined maximum current output.

Other objects and advantages of the invention will be apparent from the following description, the accompanying drawings and the appended claims.

BRIEF DESCRIPTION OF THE DRAWINGS

FIG. 1 is a systems block diagram of the present invention showing a backup power supply connected directly to the backup batteries and the telecommunications equipment;

FIG. 2 is a systems block diagram of a prior art telecommunications system with a back-up generator;

FIG. 5 is an electrical block diagram of the regulator circuit used in the present invention;

FIG. 6 is a waveform diagram showing the voltage-ampere output of the power supply as regulated; and FIGS. 7A-7C are an electrical schematic diagram showing in detail the power supply represented in the block diagram of FIG. 3.

DESCRIPTION OF THE PREFERRED EMBODIMENT

Figure 3:
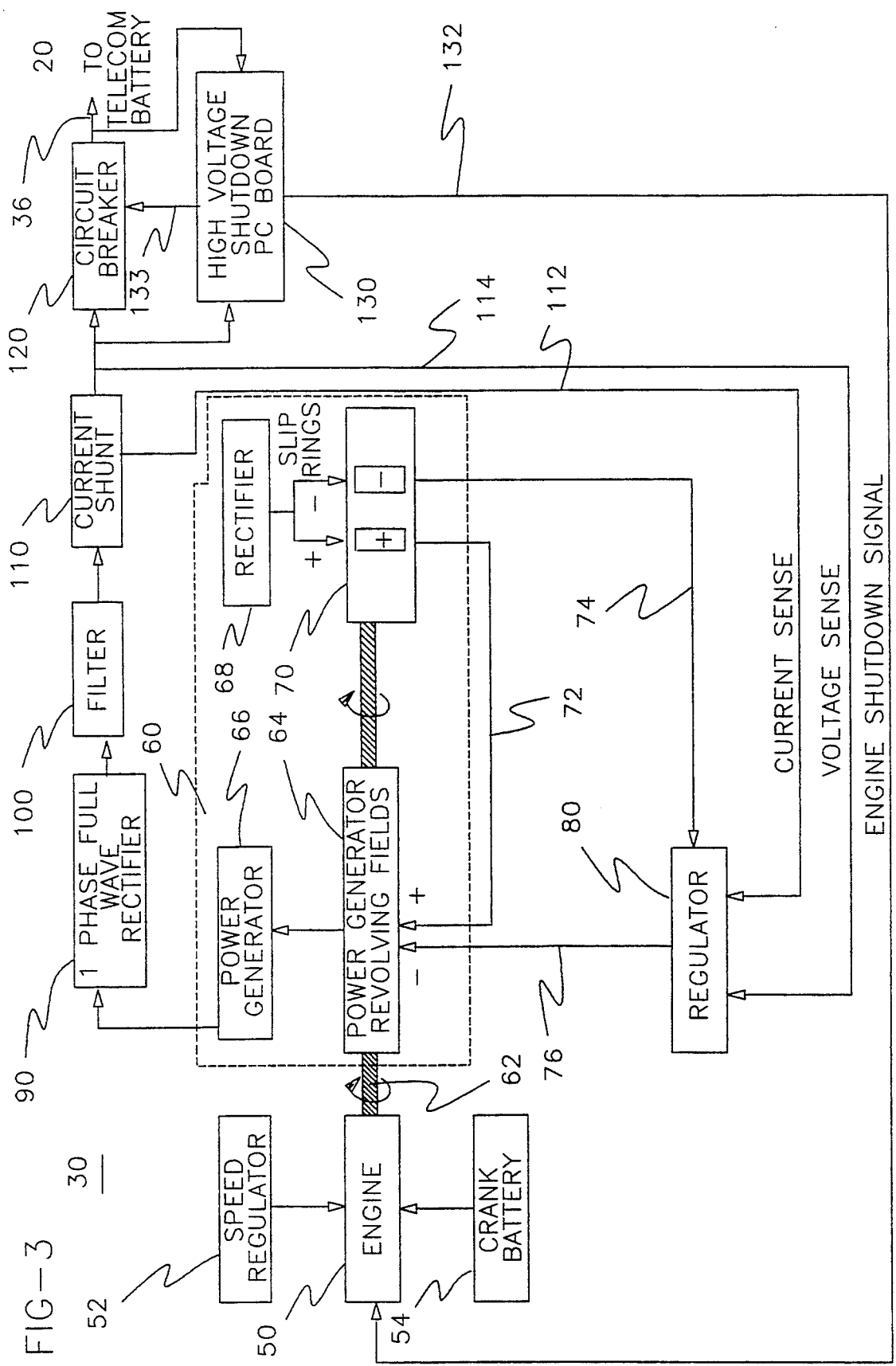
FIG. 3 is an electrical block diagram showing one form of the present invention using a single phase rotating field welding power supply.

Referring now to the drawings, and particularly to FIG. 1 which is a systems block diagram of a typical telecommunications system, commercial power from AC mains 10 is applied to a regulated rectifier circuit 15. The rectifier circuit converts the AC voltage, typically 115 or 220 volts, to direct current (DC) and applies this output to a set of back-up batteries 20. Both the rectifier circuit and the batteries 20 are connected to telecommunications equipment 25, such as would be found in a telephone exchange or in a cellular telephone repeater site. The output of the rectifier circuit is carefully regulated to provide the proper output voltage to charge and maintain the batteries 20 and to provide power to the equipment 25, and it is also properly filtered to prevent any electrical noise from interfering with the proper operation of that equipment. In the present invention, a DC power supply 30 is connected directly across the batteries 20.

A prior art telecommunications system is shown in FIG. 2 and also includes commercial mains 10, a regulated rectifier circuit 15, back-up batteries 20 and telecommunications equipment 25. Back-up generator 35 provides a source of AC power through a change-over switch 40 to the rectifier circuit 15.

Referring now to the electrical block diagram of FIG. 3 showing a single phase rotating field welding power supply constructed according to this invention, DC power supply 30 includes an engine 50 with associated speed regulator 52 and crank or engine starting battery 54; an alternating current generator 60 connected to the engine by rotating shaft 62 which is provided with a set of rotating field coils 64, power windings 66, rectifier 68 and slip rings 70; a regulator circuit 80, a full wave rectifier circuit 90; a filter circuit 100; a current sensing shunt 110; circuit breaker 120 and high voltage shutdown circuit 130.

The regulator circuit 80 has two inputs, one on line 112 from the current shunt 110 representing the actual current flowing to the telecommunications system batteries 20 and equipment 25, and the other on line 114 representing the voltage to the batteries 20. The high voltage shutdown circuit 130 provides an output on line 132 to disconnect the engine ignition and an output on line 133 to open breaker 120 in the event of an over voltage condition. The regulator circuit 80 provides for a variable voltage output at 24 or 48 volts nominal, with regulation in the order of ±0.5% up to 100% load.

As shown in FIG. 3, a single phase power supply 30 is provided, and typically, the engine 50 and generator 60 are similar to the Hobart Company Model Champion 18 Air Cooled Gas Drive Welder, delivering up to 250 amps output current at approximately 20 volts.

Figure 4:
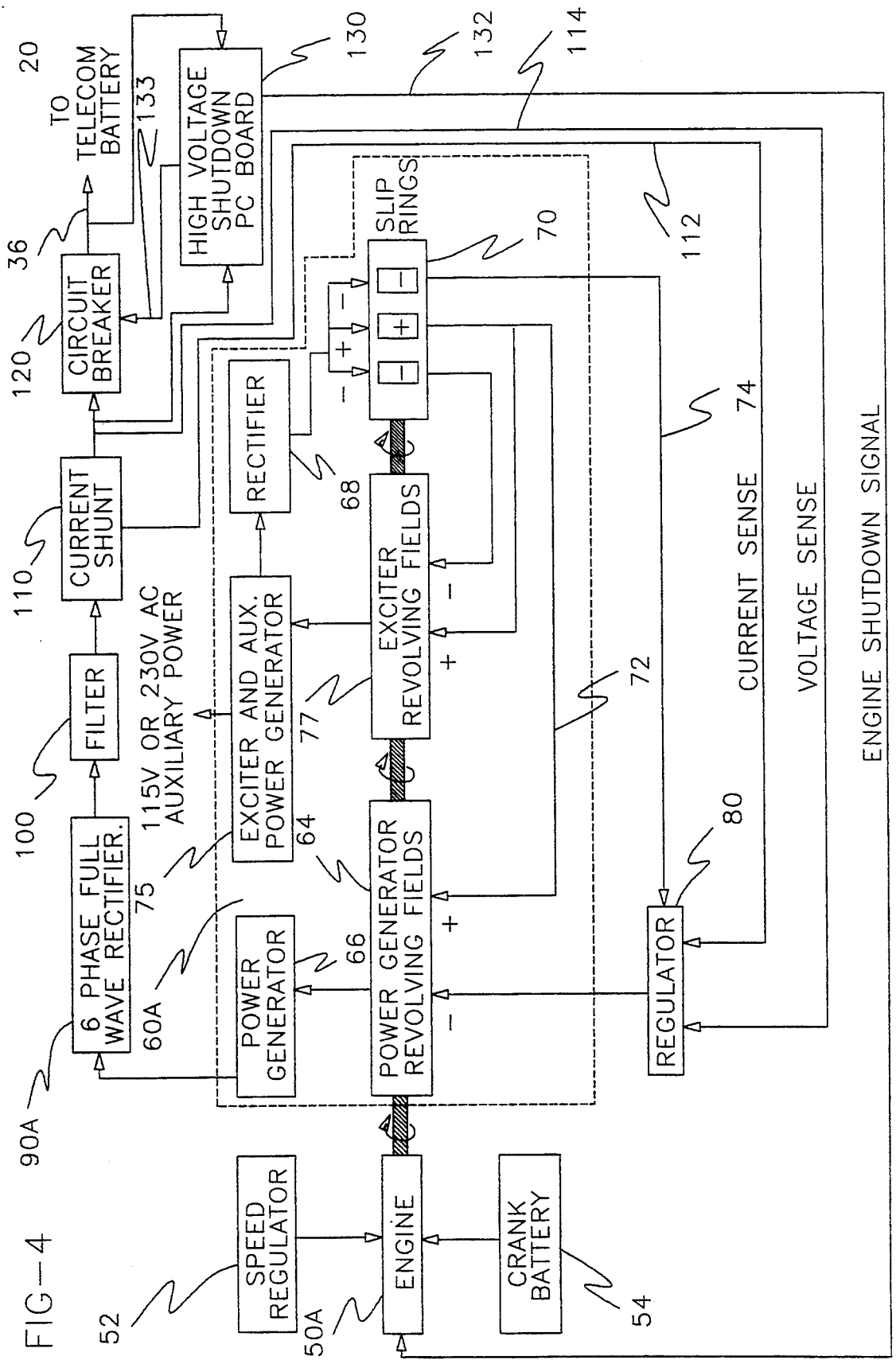
FIG. 4 is an electrical block diagram showing an alternative form of the present invention using a six-phase rotating field power supply.

FIG. 4 shows an alternative form of the present invention using a six-phase rotating field power supply wherein a six-phase generator 60a provides approximately a 200 amp output to a six-phase full wave rectifier circuit 90a. The generator 60a includes a exciter and auxiliary power generator 75 and exciter revolving fields 77 not found in FIG. 3 for providing a source of 115 volt or 230 volt auxiliary power. This auxiliary power generator 75 is not part of the present invention. The engine 50a and generator 60a may be similar to the MEGA-ARC TM 4030G 300 Amp Constant Current Gas Drive Welding Generator manufactured by the Hobart Brothers Company of Troy, Ohio. The other components in FIG. 4 are the same as shown in FIG. 3 and carry the same reference numerals.

Referring again to FIG. 3 and also to FIG. 4, the regulator 80 controls the amount of current flowing through the rotating field windings 64 of the generator 60 in response to inputs on lines 112 and 114. As shown in FIG. 3, a part of the output from the power windings 66 is rectified by rectifier 68 and applied through slip rings 70 and the regulator to the rotating field 64. Line 72 goes directly to the field windings while line 74 passes through and is modified by regulator 80. In FIG. 4, the auxiliary power windings 75 provide power to the rectifier circuit 68.

In FIG. 5, the regulator 80 is shown as including an IGBT Q1 which is pulse width modulated to maintain the output of the generator at a predetermined value. The regulator circuit itself includes a regulated power supply 140, a current sense circuit 142 responsive to the current signal on line 112, a voltage sense circuit 144 responsive to the voltage signal on line 114, a line drop compensation circuit 146, and error amplifier 148 and a pulse width modulation circuit 150 connected to the IGBT Q1.

The line drop compensation circuit 146 allows the voltage at the point where the cables 36, 37 connect to the batteries 20 to remain constant notwithstanding the voltage drop associated with those cables. As is well known, the voltage drop in lengthy cables is a function of the resistance of the cables and the amount of current flowing therethrough. This circuit senses the actual current flow and further modifies the output of the pulse width modulator 150 to compensate for the voltage drop due to cable length. Thus, there is no need for remote sensing cable connected directly to the batteries 20.

The output of the generator 30 as measured at the current shunt 110 is shown in FIG. 6. The voltage is designed to be constant at a predetermined value V1 as the current rises to a maximum predetermined value I1, and thereafter to have a constant current output. Of course, the slope of the voltage vs ampere curve may be made to vary, if desired.

The filter circuit 100, shown in detail in FIG. 7, includes a first bank of capacitors 102, a choke 103 a second bank of capacitors 104, and a set of bleeder resistors 106. The output characteristics of this filter circuit are carefully selected so that the characteristics of the output voltage and current are compatible with a telecommunications system. In particular, the ripple voltage from the present invention is less than 100 mV, preferably less than 30 mV, and the output noise voltage (conducted) is less than 32 dBrnc (decibels above reference noise) when connected to a battery with an ampere hour capacity of four times the generator's rating. The first bank of capacitors 102 includes six electrolytic capacators, each 41000 μF with a 75 VDC rating, and the second bank includes three capacitors, each 41000 μF, also with a 75 VDC rating. The DC choke 103 has a rating of 5.5 mH.

Figure 7A:
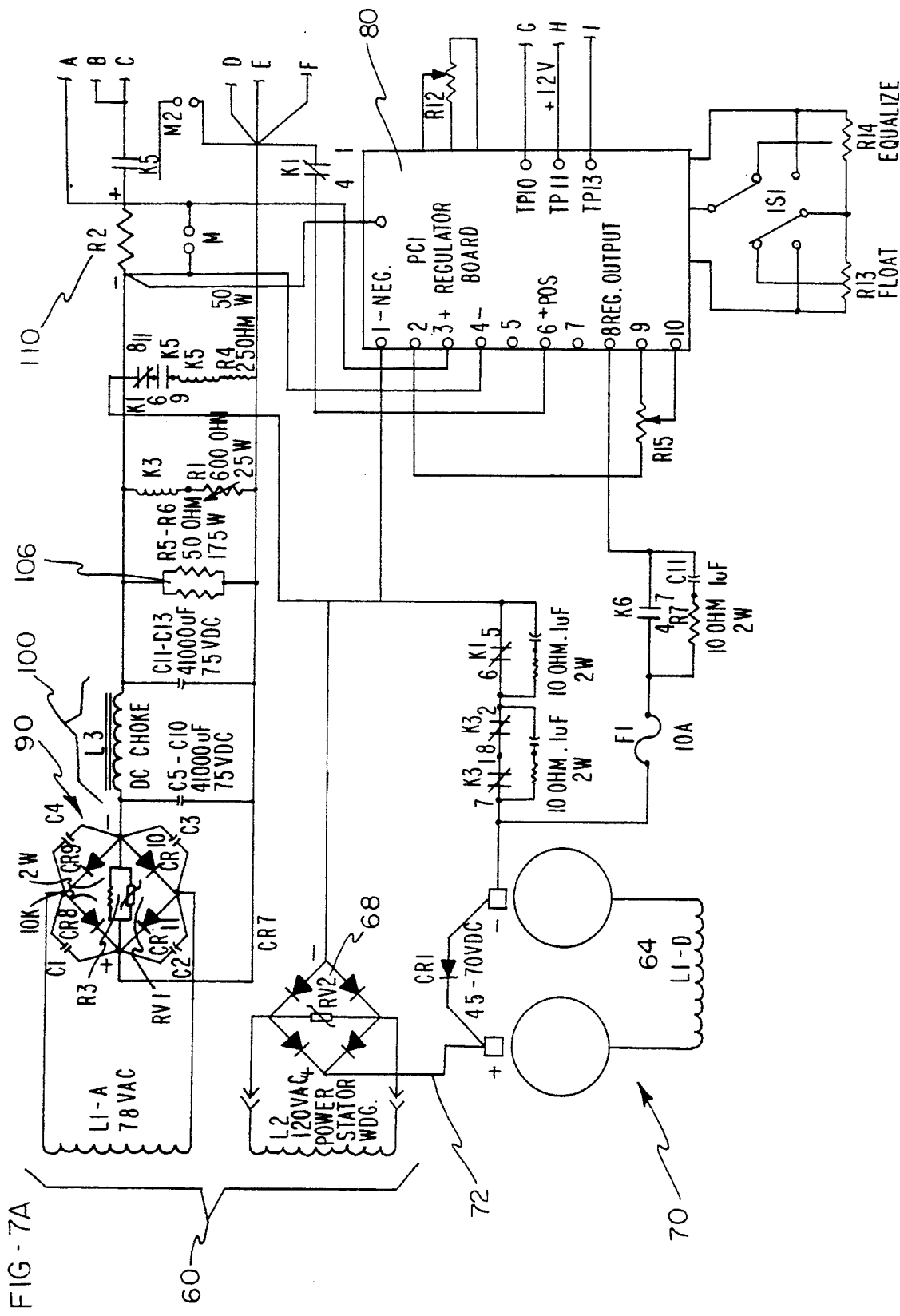
Figure 7B:
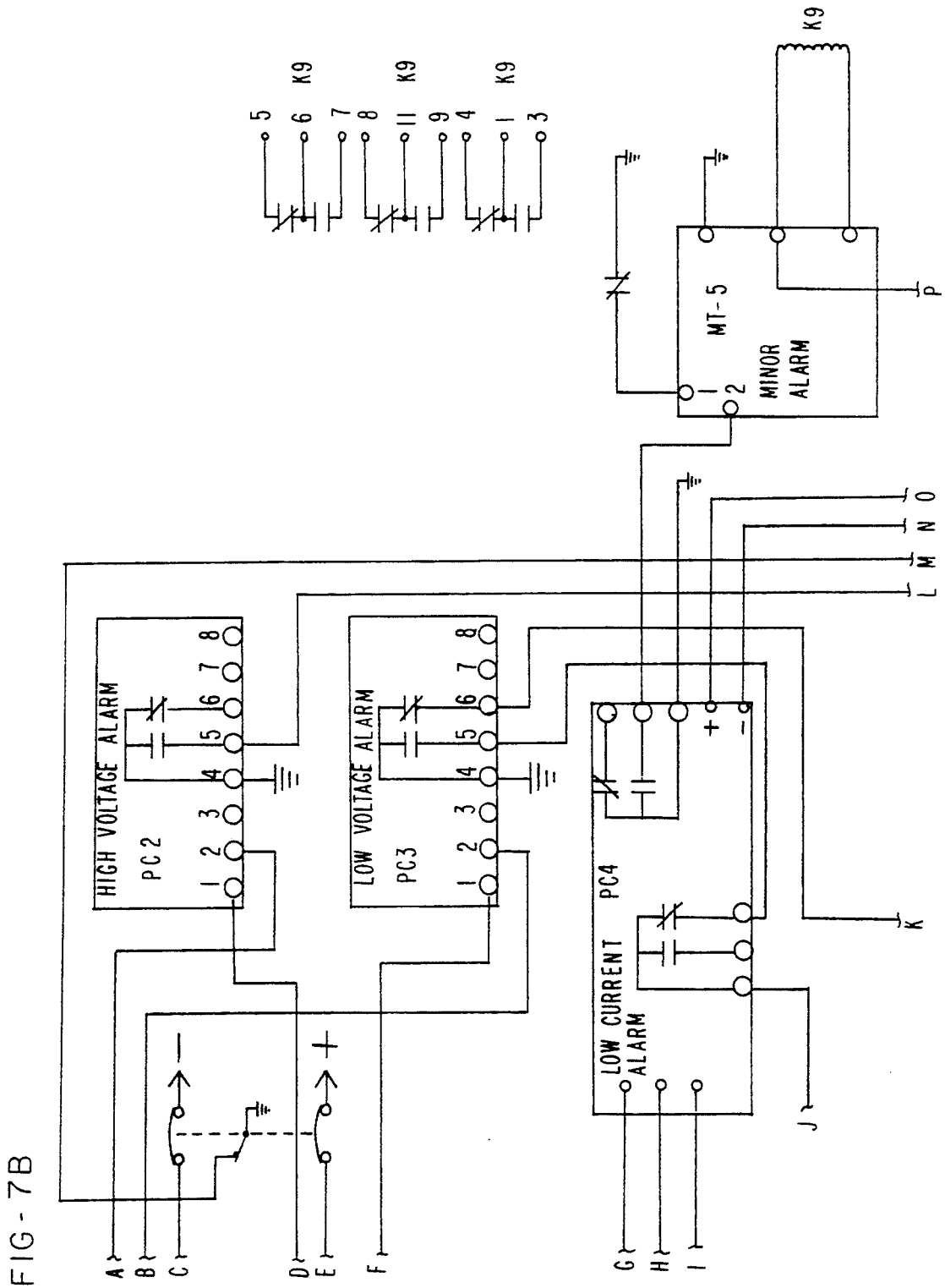

The power supply 30 shown in FIGS. 7A-7C has two modes of operation, namely an automatic mode and a test mode. The mode of operation is chosen by placing switch Auto Test Switch S2 in the desired mode. The generator may be shut down at any time and in either mode by placing switch S2 in the Off position. When shut down using Switch S2, a major alarm will be indicted by major alarm annunciator MT-5.

With switch S2 in the Test position, Push-to-Test switch S3 must momentarily be pushed and released. This places ground on terminal 4 of Automatic Engine Controller EC-1. The Automatic Engine Controller is a commercially available component manufactured by Frank W. Murphy Mfg, model number A-86. The Engine Controller EC-1includes twenty-four terminals with the following functions:

1 To Ignition/Run
2 To Batt +

3 To Gnd —
4 Start
5 Stop
6 Remote S/D input
7 Remote S/D indicator light
8 Pickup In
9 Shutdown Summary Output
10 Lockout to Exp Module
11 Oil Pressure
12 Water Temperature
13 Water Temperature
14 Oil Pressure
15 Over Speed
16 Over Crank
17 NO Aux Clutch or overspeed
18 Com Aux Clutch or overspeed
19 NC Aux Clutch or overspeed
20 To Start solenoid
21 To Alternator
22 To Batt +
23 To Battery Charger
24 Energize to stop solenoid When a ground is present on terminal 4 from switch S2, engine battery positive is supplied at terminal 20 and terminal 1 of Controller EC-1. The positive potential on terminal 20 energizes relay K4 whose contacts 4 and 7 close, thus energizing the engine starter 140. Relay K4 contacts 6 and 9 bypass the normally open oil pressure switch so that the positive potential on terminal 1 of the engine controller EC-1 is applied to the ignition coil 142, hour meter 144 and gas valve 146. The positive potential on terminal 1 of engine controller EC-1 is also applied to relay coil K6, the function of which will be discussed during the engine stop sequence.

At this time, the engine is now cranking and ignition is present with fuel on. Once the engine fires and the engine controller EC-1 senses it through the engine alternator signal 150 present at terminal 8 of the engine controller EC-1, a positive potential at terminal 20 of the engine controller EC-1 is removed and the engine starter is then disengaged. At this time, engine oil pressure should be up and a positive potential on terminal 1 of the engine controller EC-1 is applied to the ignition, gas valve and hour meter through the oil pressure switch 152. The positive potential at terminal 1 of the engine controller EC-1 is also applied to relay K1 and idle solenoid K2 through common and normally closed contacts of engine controller EC-1 terminals 18 and 19.

Terminals 18 and 19 of the engine controller EC-1 remain closed for approximately one minute after the engine starts. Once the positive potential is removed from terminal 18 of the engine controller EC-1, the idle solenoid and relay K1 are de-energized. With relay K2 released, the engine speed is then allowed to increase to its governed speed of approximately 3600 RPM. With Relay K1 contacts 5 and 6 now closed, the residual magnetism of the alternator 60 is allowed to self excite the alternator. This residual magnetism produces an AC voltage which is rectified by diode bridge CR7 and feed back to the revolving fields 64. The positive voltage from CR7 bridge is fed directly to the positive slip ring and the negative voltage is fed back directly through contacts 6 and 5 of K1 and contacts 1 and 7 as well as contacts 8 and 2 of Relay K3. As the voltage is quickly rising, so is the main alternator voltage which supplies bridge rectifier 90, including diodes CR8, CR9, CR10 and CR11. The rectified output of this bridge configuration builds up to the point where relay K3 is energized and K3 contacts 7 and 1 as well as 8 and 2 open and now give the control of the generator to the regulator 80. This control is from the negative slip ring through fuse F1, relay K6 contacts 4 and 7 to terminal 8 of the voltage regulator 80. As the output of the generator 60 approaches approximately 48 Vdc, the output contactor K5 is energized through relay K1 contacts 8 and 11 and relay K6 contacts 6 and 9. When K5 closes output is applied to the load through circuit breaker CB1.

The start sequence described above for the test mode can be used for the automatic mode, with the following exception: the ground signal present at terminal 4 of the engine start control is applied through switch S2 in the Auto position and through the low voltage alarm PC3 relay contacts. Low voltage alarm PC3 constantly monitors the voltage of batteries 20 and can be adjusted to start the generator 30 at any voltage level.

When the generator 30 is operating in the Test mode, the only way to stop the generator is to place Switch S2 in the Off position. This removes engine battery from the engine controller EC-1 for an immediate shutdown. When it is in the Automatic mode, this method can also be used although the normal mode would be automatic. Automatic stop occurs when the voltage level of batteries 20 has risen high enough to close contacts 4 and 5 of the low voltage board PC3 and the output current has decreased to a point where the contacts of the low current alarm PC4 close. This then energizes time delay relay K7 which after an adjustable time period, closes contacts 3 and 1 of K7, thus placing ground through switch S2 on Terminal 5 of the engine start control. This signals the engine controller EC-1 to close contacts at terminal 18 and 19 of the engine controller EC-1 which energizes idle solenoid K2, forcing the engine to the idle mode. Relay K1 is also energized at the same time opening its contacts 8 and 11 which open the output contactor K5, disconnecting the generator from the load. K1 contacts 1 and 4 also open removing positive voltage from the output voltage regulator.

The engine will continue to run for one minute after the stop signal was applied at terminal 5 of the engine controller EC-1. After one minute the engine controller EC-1 will remove the positive potential at terminal 1 of the engine controller EC-1, removing engine positive from the ignition coil, gas valve and hour meter at which time the engine will stop.

Two alarm annunciators MT-5A and MT-5B are used to record any alarm conditions, one for minor alarms, the other for major alarms. Both are manufactured by Frank W. Murphy Mfg. Both annunciators are identical and have connected to them a relay with 3 sets of form C contacts for use by the end user. These relays are latched on when an alarm condition occurs and must manually be reset at the MT-5 module.

A minor alarm is sent for a low fuel condition or when engine battery potential is below 8.5 VDC while cranking the engine. A major alarm is sent when the following occurs: low oil pressure, circuit breaker is off, engine overspeed, high voltage or an overcrank situation occurs. The engine will also shut down if an oil pressure, overspeed, high voltage, or overcrank alarm occurs. If the engine has been shut down due to an alarm, switch S2 must be placed in the Off position and returned to the auto or test position before the engine is allowed to restart.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. In a telecommunications system including a battery connected to the telecommunications system, a connection to a source of normally available alternating current, a rectifier circuit and filter circuit for converting said alternating current source to direct current which is applied directly to said battery and to said telecommunications system, the improvement comprising
   a low noise, essentially ripple free voltage and current regulated secondary source of direct current connected directly to said battery and telecommunications system, said secondary source including
   an engine driven alternating current generator for providing a controllable output voltage and current to the battery and telecommunications system,
   a regulator circuit for controlling the output voltage and current of said generator,
   a second rectifier circuit for converting the generator output to a direct current output current and voltage,
   a second filter circuit connected to the output current and voltage of said second rectifier circuit for providing an output voltage having a ripple component that does not exceed 100 mVolts and a noise value that does not exceed 32 dBrnc, and
   a current sensor for monitoring the output current of said second rectifier circuit to the telecommunications system,
   wherein said regulator circuit is responsive to said current sensor and said output current and voltage of said second rectifier circuit for providing a regulated output voltage level up to a predetermined maximum current output.

2. The power supply of claim 1 wherein said regulator circuit maintains said output voltage at a constant value up to said predetermined maximum current output.

3. The power supply of claim 1 wherein said current sensor is placed at output of said second filter circuit.

4. The power supply of claim 1 further including
   a set of electrical cables for connecting said power supply to said telecommunications system, and
   a line drop compensation circuit for maintaining the level of the voltage from said second filter circuit at the telecommunications system at a predetermined level independent of any voltage drop across said connecting cables.

5. The power supply of claim 1 further including
   a circuit breaker connected between said secondary source of direct current and said telecommunications system,
   means for sensing a high voltage condition at the output of said secondary source of direct current, and
   means for shutting down said engine driven generator and opening said circuit breaker upon the occurrence of an overvoltage condition.

6. The power supply of claim 1 wherein said engine driven generator is provided with a fixed armature and includes rotating field coils.

7. In a telecommunications system including a battery connected to the telecommunications system, a connection to a source of normally available alternating current, a rectifier circuit and filter circuit for converting said alternating current source to direct current which is applied to said battery and to said telecommunications system, the improvement comprising a low noise, essentially ripple free power supply for supplying power directly to said battery and said telecommunications system, said power supply including
   an engine,
   a rotating field power generator driven by said engine for producing a controllable voltage output and a controllable current output,
   a regulator circuit connected to the rotating field of said power generator for controlling said voltage and current output of said power generator,
   a second rectifier circuit for converting the power generator output to a direct current output,
   a second filter circuit connected to the output of said second rectifier circuit for providing an output voltage and current having a ripple component that does not exceed 100 mVolts and a noise value that does not exceed 32 dBrnc,
   a current sensor connected to the output voltage and current of said second filter circuit for monitoring the output current supplied to the telecommunications system, and
   a high voltage shutdown circuit for shutting down said engine whenever said output voltage supplied to the telecommunications system exceeds a predetermined level,
   wherein said regulator circuit is responsive to said current sensor and the output voltage of said second filter circuit for providing to the telecommunications system a regulated, substantially constant, output voltage level up to a predetermined maximum current output.

8. The power supply of claim 7 further including a circuit breaker connected between said power supply and said telecommunications system and responsive to an output from said high voltage shutdown circuit for disconnecting said power supply from said telecommunications system whenever said output voltage level from said second filter circuit exceeds said predetermined level.

9. A method of providing a low noise, essentially ripple free, back-up source of power directly to a telecommunications system where a battery is constantly connected to the telecommunications system to provide a backup source of electrical energy and wherein the battery and the telecommunications system are both provided with a source of direct current energy through a rectifier and filter circuit connected to a normally available source of alternating current, the method including the steps of
   providing a voltage and current regulated secondary source of alternating current whenever the normally available source of alternating current fails, and
   providing an independent means for rectifying and filtering said secondary source of alternating current to provide a source of direct current which is connected directly to the battery and telecommunications system, said direct current source having an controlled output voltage having a ripple component that does not exceed 100 mVolts and a noise value that does not exceed 32 dBrnc.

* * * * *